C. P. RANDOLPH.
VEHICLE SPRING.
APPLICATION FILED FEB. 20, 1915.
1,199,111.  Patented Sept. 26, 1916.
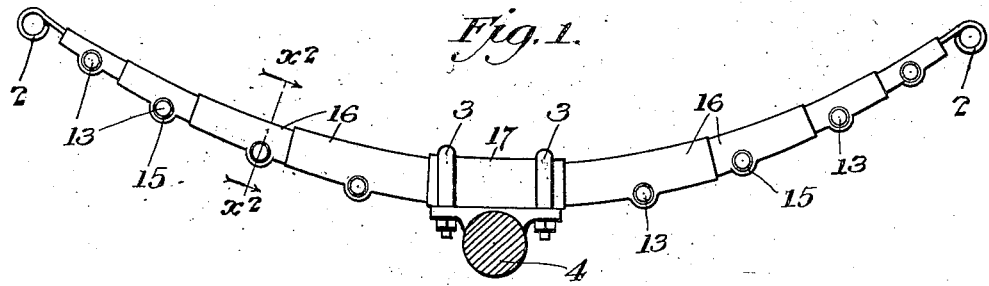
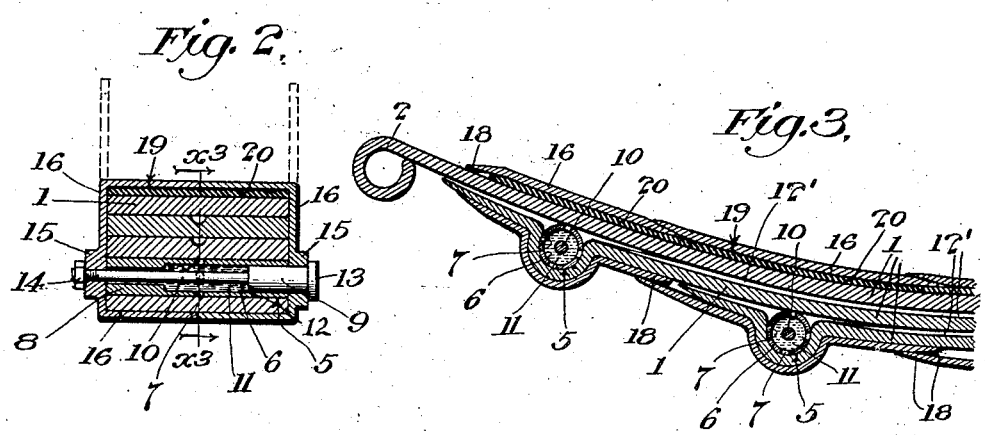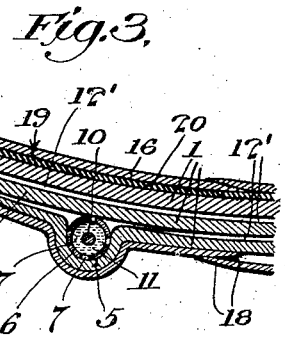

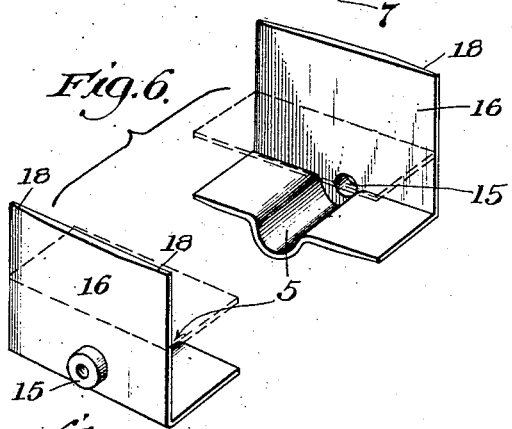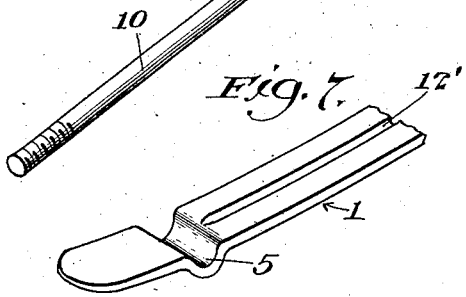
Witnesses:
Inventor:
Claborn P. Randolph
By Frederick P. Ryan
Attorney

UNITED STATES PATENT OFFICE.

CLABEORN P. RANDOLPH, OF LOS ANGELES, CALIFORNIA.

VEHICLE-SPRING.

1,199,111.            Specification of Letters Patent.     Patented Sept. 26, 1916.

Application filed February 20, 1915. Serial No. 9,587.

*To all whom it may concern:*

Be it known that I, CLABEORN P. RANDOLPH, a citizen of the United States, residing at Los Angeles, in the county of Los Angeles and State of California, have invented a new and useful Vehicle-Spring, of which the following is a specification.

An object of this invention is the provision of a vehicle spring which is of maximum flexibility during the entire period of the life of said spring.

With springs heretofore invented said springs have been very effectively lubricated when they are absolutely new, but after being in use for some time the lubricant gradually melts and is pressed out from between the spring leaves and escapes, and an object of this invention is to make provision for conveniently renewing the lubricant from time to time between adjacent leaves, so that the spring will not stiffen with age, but will remain perfectly resilient from first to last because of efficient lubrication of the different leaves at all times.

Another object is the production of a spring that is proof against dust, rust and water.

Another object is the production of a novel housing or jacket for the spring leaves so as to make the spring dust, rust and water proof.

Another object is to practically maintain immersion of the spring in the lubricant.

Another object is to provide a vehicle leaf spring so constructed as to reduce friction between adjacent leaves to a minimum.

Another object is to provide a construction effective to prevent parting or separating of the leaves if one of said leaves should break.

Another object is to make provision for resilient action of a spring leaf even though said leaf should be broken.

Another object is the production of a superior spring clip so fastened in place as to strengthen rather than weaken the spring.

Other objects and advantages may appear as the invention is unfolded in the subjoined detail description taken in connection with the drawings filed herewith.

The accompanying drawings illustrate the invention.

Figure 1 is a side elevation of the newly invented spring mounted on an axle. Fig. 2 is a cross section on line indicated by $x^2$—$x^2$, Figs. 1 and 3. Fig. 3 is a fragmentary longitudinal section on line indicated by $x^3$—$x^3$, Fig. 2. Fig. 4 is an enlarged detail of the novel lubricant cup shown in the preceding views. Fig. 5 is a perspective view of the clip bolt. Fig. 6 is a perspective view of the two separable members forming one of the spring clips. Fig. 7 is a perspective view of one of the spring leaves.

Arrows on the section lines in some of the views indicate the direction of sight.

There are provided any desired or requisite number of separate superposed curved spring leaves 1 of different lengths as is common in the art, a master or main leaf and one or more subleaves, and said master leaf may be connected to a vehicle by any suitable means, as by end loops 2 and bolts, not shown. Leaves 1 are connected by any suitable means such as clips 3 to an axle 4.

Each of the spring leaves 1 is provided near each end on its convex face with a transverse substantially semicircular rib forming a channel 5 on its concave face to accommodate a bearing member in the form of a tubular sleeve or roller 6 having midway of its ends vents 7 for passing lubricant from the interior of said sleeve. The channel 5 is of such depth that the distance from its top to its bottom is somewhat less than the diameter of the sleeve 6, so that the next upper leaf spring will rest on the sleeve and tend to turn said sleeve when the extremities of the leaves are caused to slide relative to one another by flexure of the spring caused by irregularities in the surface upon which the vehicle is traveling or caused by any means whatsoever. Each sleeve 6 substantially engages both leaves between which it is inserted.

Each sleeve 6 has its inside diameter reduced at one end by a shouldered portion 8 and is provided at its other end with a plug 9 having a stem 10 which projects through the shouldered portion 8 and is screw threaded on its projecting end. The inner ends of the shouldered portion 8 and plug 9 are spaced apart and there is thus formed between them a lubricant chamber 11, and when said chamber is provided with grease or heavy oil, indicated at 12, Fig. 2, said grease or heavy oil exudes through the vents 7 and runs downward between adjacent spring leaves so as to efficiently lubricate their contacting faces.

Each of the sleeves 6, plugs 9, and stems 10 together form a lubricant cup which is interposed between adjacent spring leaves 1 and preferably the spring leaves are provided with longitudinally extending ducts 12' communicating with the channels 7 to aid in effective distribution of the lubricant.

Each stem 10 is held in place by suitable means and in the instance shown in the drawings, for this purpose, the plug 9 is provided with a head 13 and the stem 10 is provided at its threaded end with a nut 14, said head and nut being drawn up tightly against bosses 15 projecting from the outer sides of a clip which may be formed in two separable members or duplicate halves 16.

The plug 9, stem 10, head 13 and nut 14 together form a bolt to clamp the two clip members 16 together. The members 16 of each clip extend transversely of the edges of the spring leaves and are bent under the bottom spring leaf and over the master spring leaf so that the adjacent edges of the bent over and under portions fit close together as shown in Fig. 2. It is noted that by this construction of the clip and the means for fastening it in place, the spring is not in the least weakened, but rather is strengthened.

Beneath the clips 3 and between the leaves 1 and axle 4 there is provided a middle jacket section or clip 17, and the clips formed by the members 16 are arranged end to end along the spring leaves so as to extend from the clip 17 substantially to the fastening loops 2; said clips 16 and 17 all together forming a sectional housing or jacket extending substantially from end to end of the spring and virtually inclosing said spring, it being understood that the bent over portions of the clips are not absolutely essential, since it is the sides and bottom of the jacket which are depended upon to effect substantial immersion of the spring leaves in the lubricant.

The clips 16, 17 are preferably constructed of malleable iron or the like and may be partly bent up into shape before assembling with the spring leaves or may be entirely bent up before assembling. The clips 16 interengage one another and those clips adjacent the clip 17 interengage said clip 17, and for this purpose each of the clips is provided with a tapered end 18 which is inserted into the end of the adjacent clip.

From the foregoing construction it is seen that the clips forming the sections of the jacket are capable of discharging lubricant from one into another, so as to practically maintain immersion of the spring leaves in the lubricant and prevent said lubricant from escaping.

It is particularly noted that the jacket formed by the clip members 16, 17 will become effective to prevent parting or separation of the spring leaves should some but not all of said spring leaves break, and it is also noted that should any of the spring leaves break, practically all of the resilient nature of said spring leaves will be conserved by reason of the clips nicely holding said leaves in place so that the spring will be practically as resilient after breakage as before and the break need not be repaired immediately but at any later more convenient time.

In practice the leaves 1 and clips 16, 17 will be assembled substantially as shown in Fig. 1, graphite or other lubricant having first been placed between the adjacent spring leaves in the usual manner if desired, and the lubricant cups will be filled with any desired lubricant or lubricating compound. The lubricant will gradually work out of the sleeves 6 and run downward in the ducts 12' between adjacent spring leaves so as to keep them thoroughly and constantly lubricated, and when more lubricant is required, one or more of the plugs 9 may be withdrawn from the sleeve or sleeves 6 and more lubricant supplied to said sleeves. Then the plug or plugs 9 will be replaced and will be drawn up tightly into place, as shown in Fig. 2, causing the lubricant to be forced through the vents 7 and along the ducts 12'. The lubricant cups will be recharged from time to time as becomes desirable or necessary to maintain substantial immersion of the spring leaves in lubricant. Flexure of the spring leaves causes rolling of the sleeves 6, thus minimizing friction between the leaves at the places of greatest relative movement between them and tending to cause the lubricant in the sleeves to discharge into the channels 5.

The spring leaves 1 and the bent over portions of the clips 16, 17 may be spaced apart to form a chamber 19 which may be filled with grease or be provided with a wick or cushion 20 of some absorbent yielding material such, for instance, as felt or the like to aid in holding the lubricant and insure perfect freedom of the spring leaves in their flexing movements.

What I claim is:

1. A vehicle spring comprising separate leaves, and lubricating devices, at different positions lengthwise of the spring, one of said lubricating devices being inserted at one position between two of said leaves, and the other lubricating device being inserted at another position between the uppermost of said two leaves and a third one of said leaves and discharging into the first one of said lubricating devices.

2. A vehicle spring comprising spring leaves, and rigid clips surrounding said leaves and interfitting one with another to form a jointed jacket to prevent separation of the leaves should any of them become broken.

3. A vehicle spring comprising spring leaves, rigid clips surrounding said spring and interfitting one with another to form a jointed jacket, and a lubricating device for each of said clips, said lubricating devices discharging into different inter-leaf spaces.

4. A vehicle spring comprising spring leaves, a jacket composed of sections each having one end tapered and inserted into the other end of an adjacent section.

5. A vehicle spring comprising spring leaves bent to form channels, and lubricant cups inserted in said channels respectively between adjacent spring leaves at intervals along the spring.

6. A vehicle spring comprising spring leaves bent transversely to form channels, and lubricant cups accommodated in said channels, there being a lubricant cup between each two adjacent leaves.

7. A vehicle spring comprising spring leaves, having a transverse channel therebetween, a perforated sleeve in said channel, and a plug removably seated in one end of said sleeve.

8. A vehicle spring comprising separate leaves, one of said leaves being provided with a transverse rib forming a channel, a clip bent to accommodate said rib, and a bolt extending through the sides of the clip and through said channel to fasten the clip in place.

9. A vehicle spring comprising separate leaves, one of said leaves being provided with a transverse rib forming a channel, a clip bent to accommodate said rib, a tubular perforated sleeve in said channel, and a bolt extending through the sides of the clip and through said sleeve to hold the clip in place.

10. A vehicle spring comprising spring leaves having a transverse channel therebetween, a perforated sleeve in said channel, a clip having a hole in one side, a plug extending through the hole into the sleeve, and a stem connecting the plug to the other side of the clip.

11. A vehicle spring comprising spring leaves, and tubular perforated rollers between adjacent leaves to feed lubricant to the contacting faces of said leaves.

12. A vehicle spring comprising separate leaves, and a series of relatively free interengaging rigid clips to bind the leaves together.

13. A vehicle spring comprising separate leaves and having a transverse rib, a clip composed of separable members bent under the lower leaf and over the upper leaf and having a channel to fit said rib and a bolt fastening said members to one another.

14. A vehicle spring comprising separate leaves and having a transverse rib, a clip composed of separable U-shaped members and having a channel to fit said rib, and a bolt passing through the intermediate limbs of the U-shaped members and between adjacent leaves to clamp said U-shaped members to said leaves.

15. A vehicle spring comprising separate leaves, one of said leaves having a transverse rib, a clip provided with a transverse seat to fit said rib and bent around the leaves to fasten said leaves together, and a lubricant cup in said seat.

16. A vehicle spring comprising separate leaves, one of said leaves having a transverse rib forming a channel, a rebound clip provided with a transverse seat to fit said rib and bent around the leaves, and a bolt extending through the sides of said clip and through said channel.

17. A vehicle spring comprising separate leaves, one of said leaves having a channel extending to one longitudinal edge of the leaves, a perforated roller in said channel between adjacent leaves, and means to hold said leaves together.

18. A vehicle spring comprising separate leaves, one of said leaves having a channel extending to one longitudinal edge of the leaves, a duct extending longitudinally of said one leaf and communicating with said channel, a perforated roller in said channel between adjacent leaves, and means to force lubricant from said roller into said duct.

19. A vehicle spring comprising separate leaves, a sectional jacket extending substantially from end to end of the spring and composed of rigid members surrounding the spring and interfitting one with another, and a lubricant feeding device at the ends of the jacket.

In testimony whereof, I have hereunto set my hand at Los Angeles, California, this 9th day of February, 1915.

CLABEORN P. RANDOLPH.

In presence of—
  GEORGE H. HILES,
  LORA M. BOWERS.